United States Patent [19]
Holshouser et al.

[11] Patent Number: 6,151,486
[45] Date of Patent: Nov. 21, 2000

[54] MAGNETIC LATCH AND RELEASE DEVICE AND RADIOTELEPHONES INCORPORATING SAME

[75] Inventors: Howard Eugene Holshouser, Efland; James Calvin Peele, Raleigh; John Charles Phillips, New Hill, all of N.C.

[73] Assignee: Ericsson Inc., Research Triangle Park, N.C.

[21] Appl. No.: 09/182,682

[22] Filed: Oct. 30, 1998

[51] Int. Cl.[7] .................................................. H04B 1/38
[52] U.S. Cl. ........................... 455/90; 455/550; 455/575; 379/433; 379/434
[58] Field of Search ............................ 455/90, 575, 550, 455/347, 348, 351; 379/433, 434

[56] References Cited

U.S. PATENT DOCUMENTS

| | | | |
|---|---|---|---|
| 5,493,690 | 2/1996 | Shimazaki | 455/575 |
| 5,566,362 | 10/1996 | Bauer et al. | 455/575 |
| 5,659,888 | 8/1997 | Kato et al. | 455/90 |
| 5,706,332 | 1/1998 | Nagai | 455/575 |
| 5,857,157 | 1/1999 | Shindo | 455/90 |

*Primary Examiner*—Nay Maung
*Assistant Examiner*—Quochien B. Vuong
*Attorney, Agent, or Firm*—Myers Bigel Sibley & Sajovec, P.A.

[57] ABSTRACT

An electronic device, such as a radiotelephone, has a magnetic latch that maintains a flip cover in a closed position and an electromagnetic release conveniently positioned for one-handed operation by a user. A first magnetic object is disposed within the housing and a second magnetic object is disposed within the flip cover so as to be magnetically attracted to the first magnetic object when the flip cover is in the closed position. The first and second magnetic objects are configured such that the magnetic attraction force therebetween is greater than the biasing force of the spring member to maintain the flip cover in the closed position. A user-activated magnetic field generator is disposed adjacent to at least one of the first and second magnetic objects and reduces the magnetic attraction force between the first and second magnetic objects relative to the biasing force of the spring member such that the flip cover is urged to the open position.

45 Claims, 7 Drawing Sheets

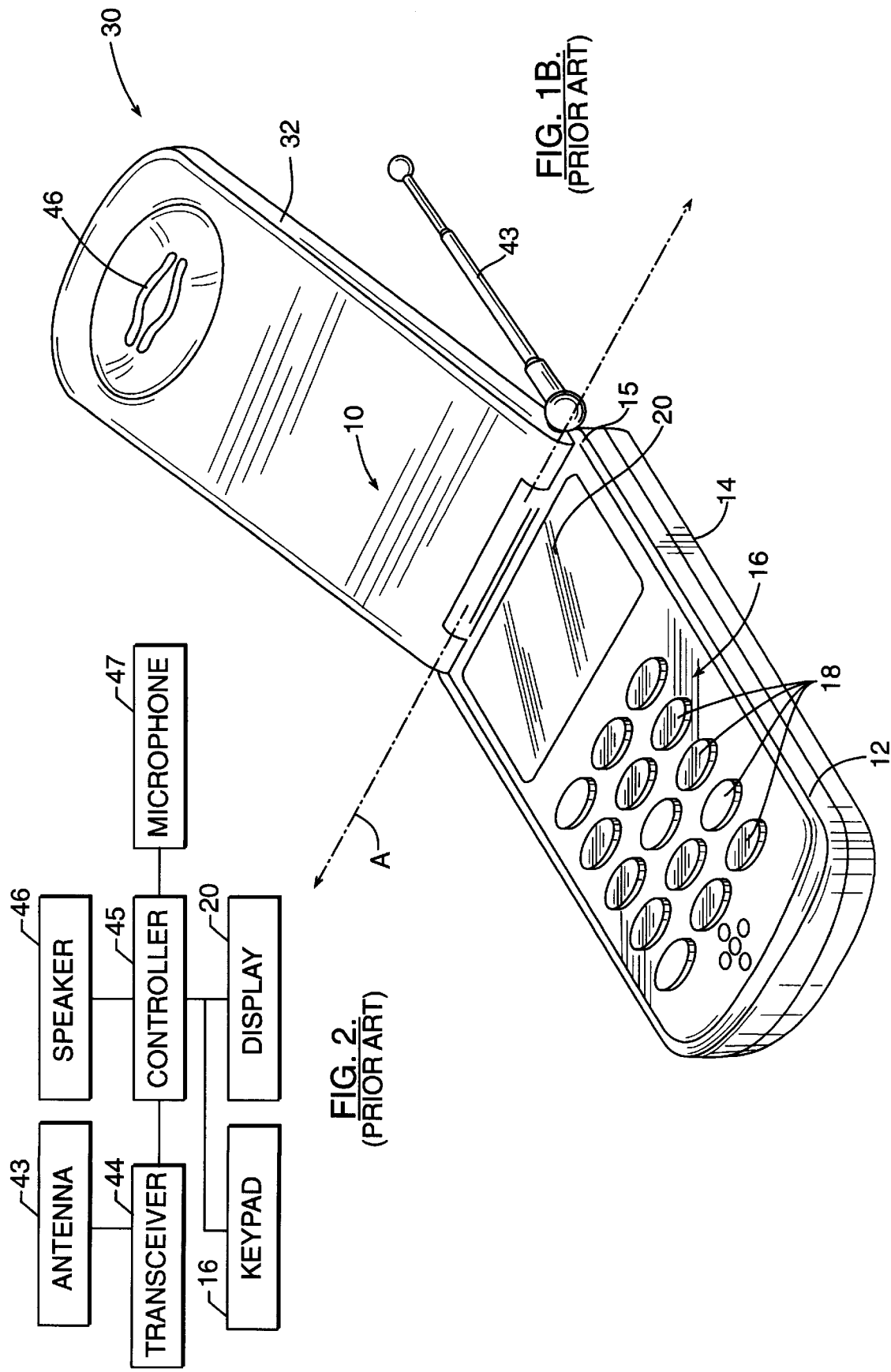

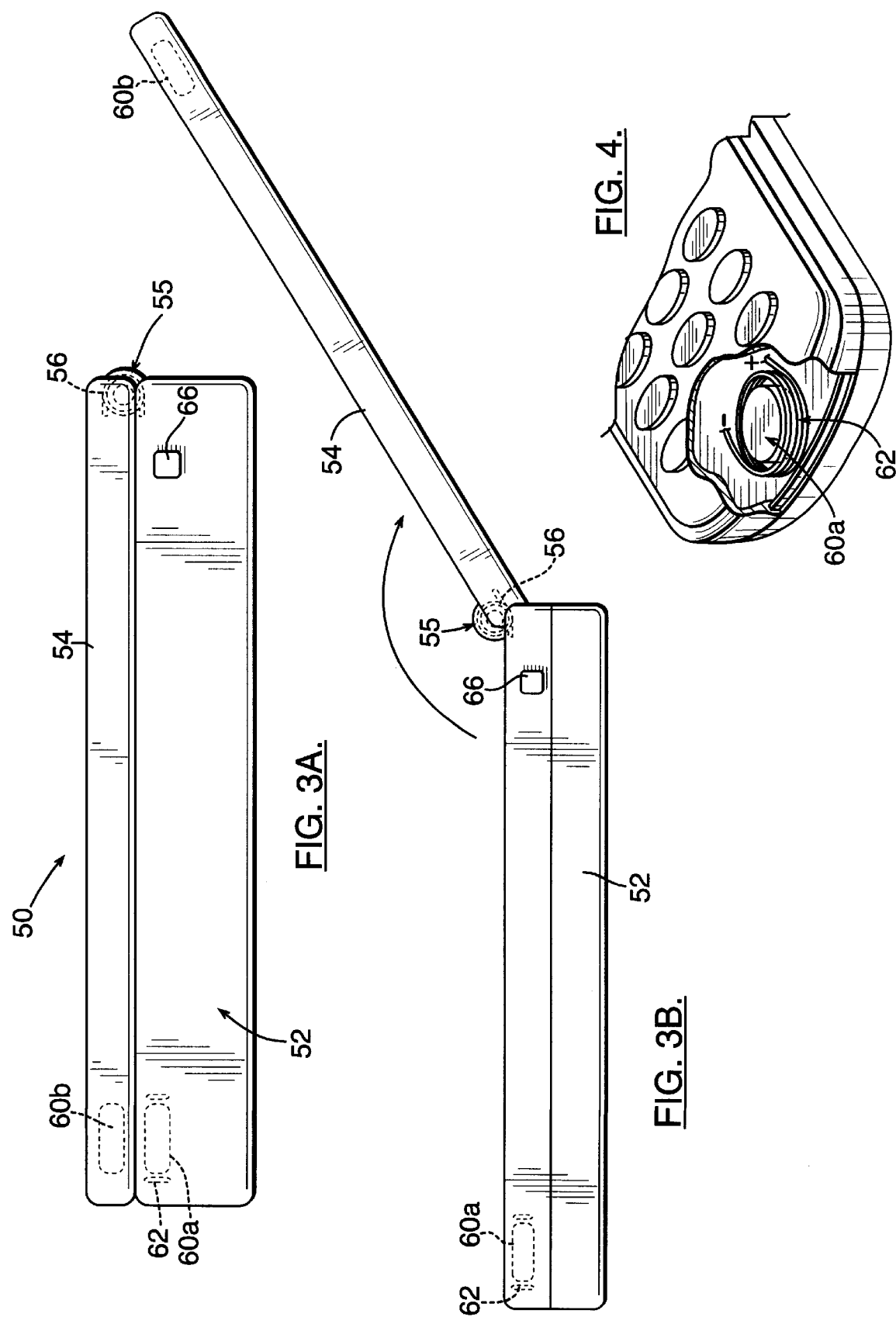

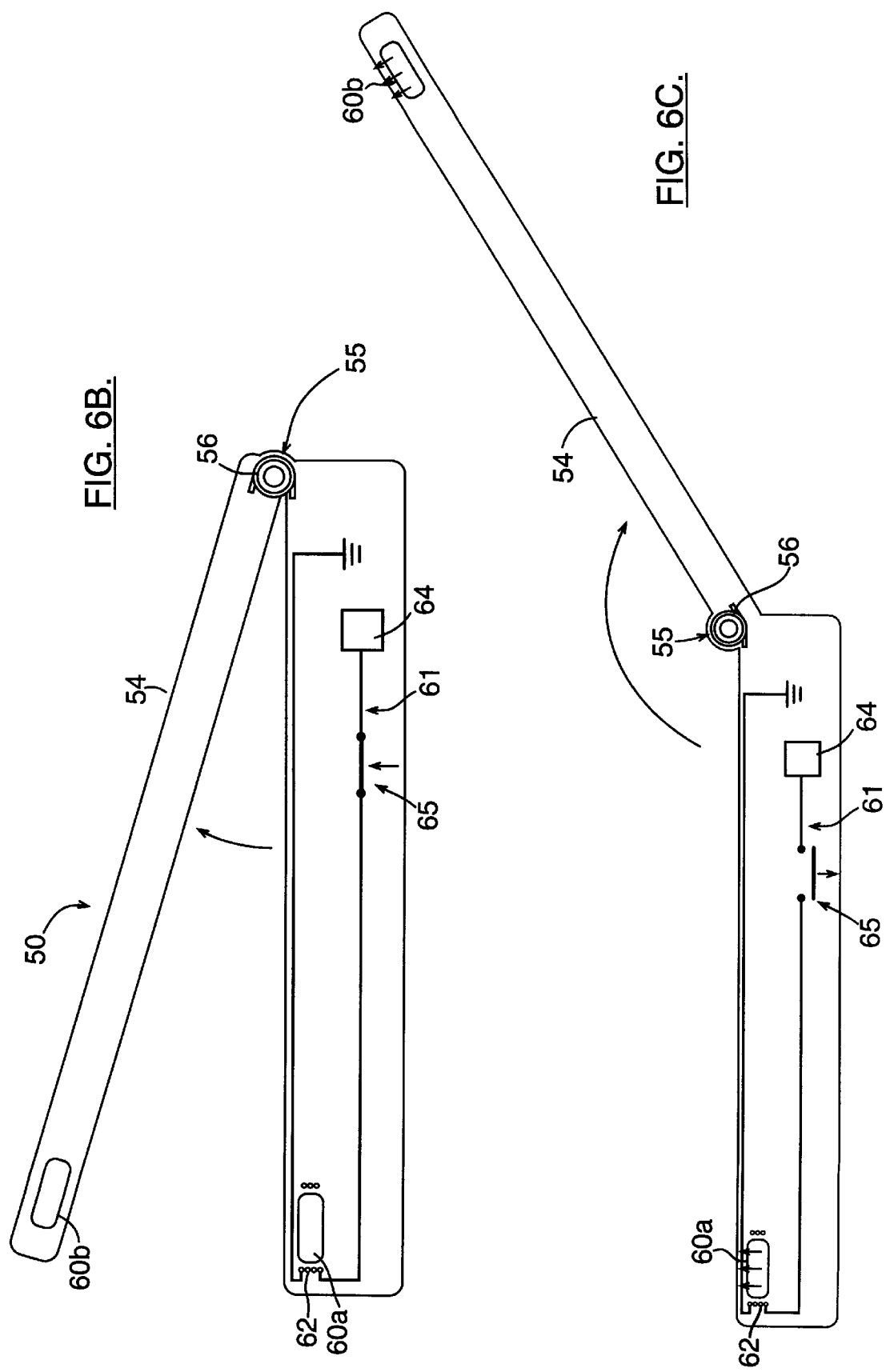

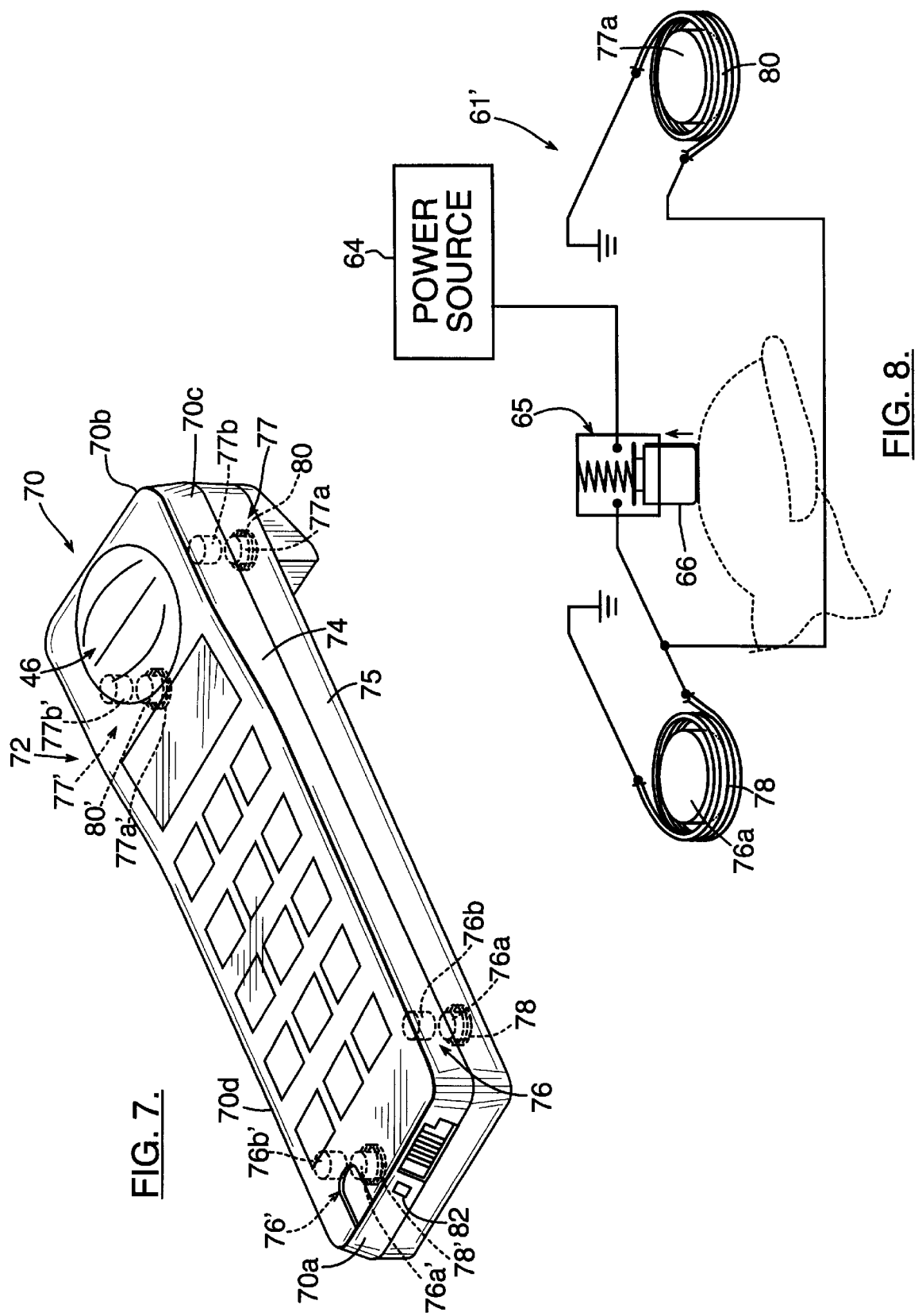

MAGNETIC LATCH AND RELEASE DEVICE AND RADIOTELEPHONES INCORPORATING SAME

FIELD OF THE INVENTION

The present invention relates generally to electronic devices and, more particularly, to electronic devices with pivotable appendages such as flip covers.

BACKGROUND OF THE INVENTION

Electronic devices, such as handheld radiotelephones (e.g., cellular telephones), may have an appendage, such as a flip cover, pivotally mounted to the housing thereof that is movable between closed and open positions. A flip cover for a radiotelephone may contain a microphone, speaker, antenna or other electronic components.

One-handed operation of a handheld radiotelephone may be desirable, particularly when a user is involved in an activity requiring use of the other hand. Unfortunately, radiotelephones incorporating flip covers may require both hands of a user to hold the radiotelephone and to open (or close) the flip cover. To facilitate one-handed operation, some radiotelephones utilize a spring-activated flip cover that is held in a closed position by a mechanical latching mechanism. Conventional latching mechanisms for spring-activated flip covers often engage a flip cover as far from the flip cover hinge as possible. Unfortunately, this may require positioning a release button for releasing a latching mechanism near the latching mechanism to avoid a long, cumbersome mechanism. With some types of flip covers, particularly flip covers hinged from the top of a radiotelephone, positioning a latch release button in a location that facilitates one-handed operation by a user may be difficult.

Conventional latching mechanisms for spring-activated flip covers also may have other drawbacks. Mechanical latching mechanisms and release buttons used therewith can be bulky. Because many contemporary radiotelephone models are undergoing miniaturization to facilitate storage and portability, the amount of space available for flip cover latching mechanisms has become limited. In addition, conventional flip cover latching mechanisms may be susceptible to wear from use which may lead to reliability problems over time.

SUMMARY OF THE INVENTION

In view of the above, it is therefore an object of the present invention to provide a latching device and release mechanism for radiotelephone flip covers wherein the release mechanism can be conveniently positioned for one-handed operation by a user.

It is another object of the present invention to provide latching mechanisms for radiotelephone flip covers that can be reliable and not as susceptible to wear as conventional mechanical latching mechanisms.

It is another object of the present invention to provide latching mechanisms for radiotelephone flip covers that can be less bulky and that do not require as much space within a radiotelephone as conventional latching mechanisms.

These and other objects of the present invention are provided by an electronic device, such as a radiotelephone, having a magnetic latch that maintains a spring-activated flip cover in a closed position and an electromagnetic release conveniently positioned for one-handed operation by a user. A first magnetic object is disposed within the housing of the radiotelephone and a second magnetic object is disposed within the flip cover pivotally attached to the housing. The second magnetic object is magnetically attracted to the first magnetic object when the flip cover is in the closed position. The first and second magnetic objects are configured such that the magnetic attraction force therebetween is greater than the biasing force of a spring member for urging the flip cover to the open position such that the flip cover is maintained in the closed position. According to one embodiment of the present invention, a magnet associated with a speaker in the radiotelephone may serve the function of the first or second magnetic object.

According to the present invention, a magnetic field generator is disposed adjacent to at least one of the first and second magnetic objects and serves as means for reducing the magnetic attraction force between the first and second magnetic objects relative to the biasing force of the spring member. When the magnetic attraction force between the first and second magnetic objects is reduced relative to the biasing force of the spring member, the flip cover is urged to the open position by the spring member. Preferably, a conductive coil encircling at least one of the first and second magnetic objects serves the function of a magnetic field generator when electrical current flow is induced therein.

An electrical circuit disposed within the radiotelephone housing is configured to connect an electrical power source with the conductive coil. The electrical circuit includes a switching element for interrupting flow of electrical current between the electrical power source and the conductive coil. A switching element control device extends through a portion of the housing in a location that is convenient to a user. The switching element control device is configured to operate the switching element such that electrical current can flow from the electrical power source through the conductive coil in response to user activation. Together, the electrical power source, electrical circuit, and switching element control device serve as means for inducing electrical current flow through the conductive coil.

The present invention is advantageous because one-handed operation of a radiotelephone incorporating a spring-activated flip cover can be facilitated. In addition, the present invention may eliminate the need for bulky and complex mechanical latching mechanisms that can be susceptible to wear and other damage over time. Furthermore, the user-operated switching element control device of the present invention can be positioned virtually anywhere on an electronic device to facilitate one-handed operation.

According to another aspect of the present invention, an electronic device, such as a radiotelephone, includes a housing with first and second portions configured to be joined together to enclose various electronic components. A first magnetic object is disposed within the first housing portion. A second magnetic object is disposed within the second housing portion and is positioned so as to be magnetically attracted to the first magnetic object when the first and second housing portions are joined together. The first and second magnetic objects are configured to generate a magnetic attraction force therebetween that can maintain the first and second housing portions securely joined together without the need for mechanical fasteners.

A magnetic field generator is disposed adjacent to at least one of the first and second magnetic objects and serves as means for reducing the magnetic attraction force between the first and second magnetic objects such that the first and second housing portions can be separated. Preferably, a conductive coil encircling at least one of the first and second magnetic objects serves the function of a magnetic field generator when electrical current flow is induced therein.

An electrical circuit disposed within the housing is configured to connect an electrical power source with the conductive coil. The electrical circuit includes a switching element for interrupting flow of electrical current between the electrical power source and the conductive coil. A switching element control device extends through a portion of the housing and is configured to operate the switching element such that electrical current can flow from the electrical power source through the conductive coil in response to user activation. Together, the electrical power source, electrical circuit, and switching element control device serve as means for inducing electrical current flow through the conductive coil.

This aspect of the present invention is advantageous because various housing portions of an electronic device can be assembled magnetically without the need for various mechanical fasteners, such bolts, screws, and the like. Accordingly time and costs associated with the manufacturing of electronic devices, such as radiotelephones, may be reduced.

BRIEF DESCRIPTION OF THE DRAWINGS

FIG. 1B illustrates an exemplary radiotelephone, including a "top-hinged" flip cover, within which a magnetic latch release apparatus according to the present invention may be incorporated.

FIG. 2 is a schematic illustration of a conventional arrangement of electronic components for enabling a radiotelephone to transmit and receive telecommunications signals.

FIG. 3A illustrates a radiotelephone with a top-hinged flip cover wherein the flip cover is secured to the housing in a closed position by the magnetic attraction of a magnetic object mounted within the housing and a magnetic object mounted within the flip cover, according to an embodiment of the present invention.

FIG. 3B illustrates the radiotelephone of FIG. 3A wherein the flip cover is in an open position.

FIG. 4 is an enlarged, fragmented, perspective view of a magnetic object mounted within the housing of a radiotelephone and having a coil wrapped therearound, according to an embodiment of the present invention.

FIG. 6B illustrates the radiotelephone of FIGS. 3A–3B wherein the coil has been energized to overcome the mutual attraction of the two magnetic objects so the flip cover can move to an open position.

FIG. 6C illustrates the radiotelephone of FIGS. 3A–3B with the flip cover in the open position.

FIG. 7 illustrates another embodiment of the present invention wherein portions of an electronic device housing are joined together magnetically.

FIG. 8 illustrates an electrical circuit for inducing electrical current flow through respective conductive coils to physically separate magnetic objects used to secure together various housing portions of an electronic device, according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
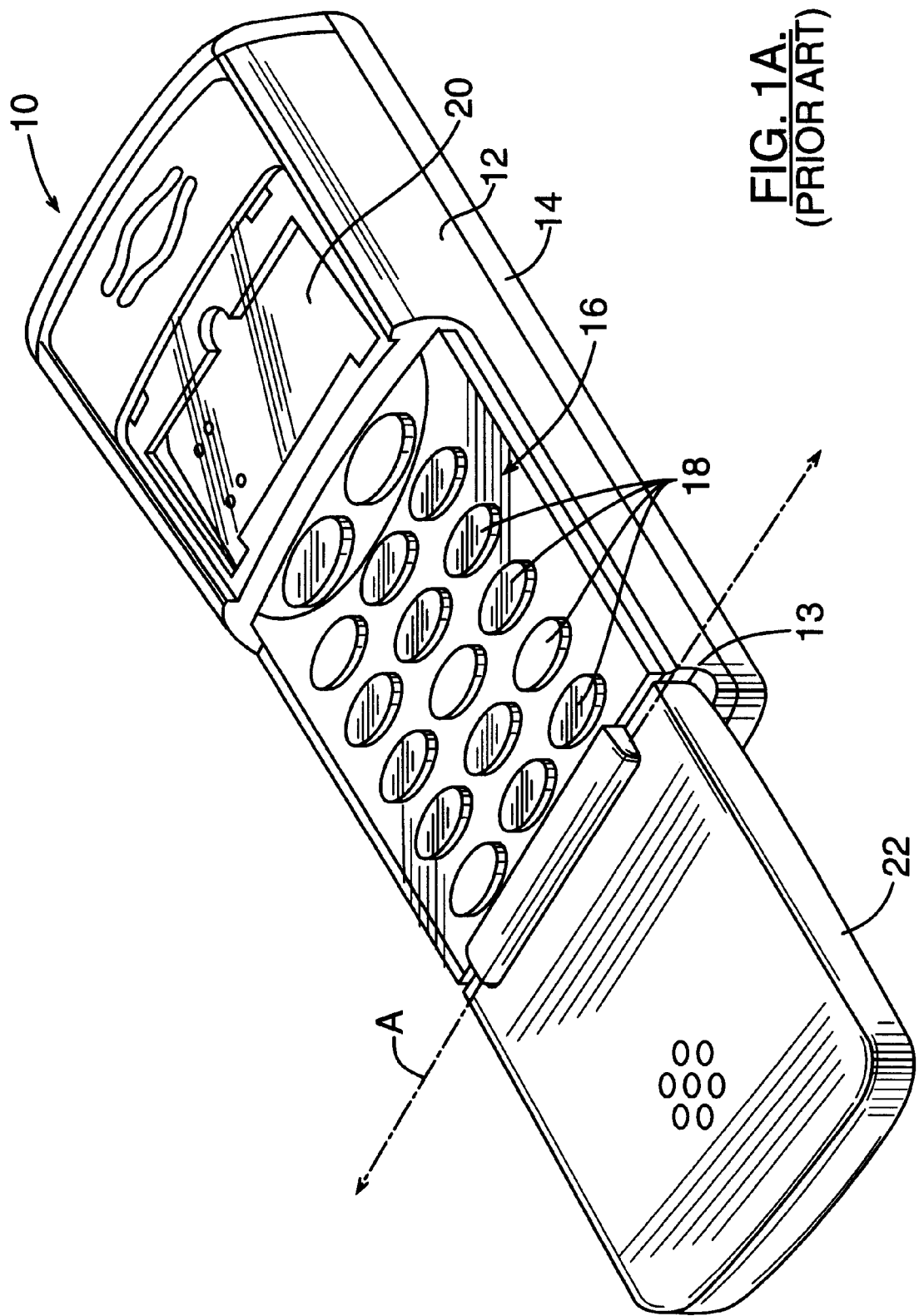
FIG. 1A illustrates an exemplary radiotelephone, including a "bottom-hinged" flip cover, within which a magnetic latch release apparatus according to the present invention may be incorporated.

Referring now to FIG. 1A, a radiotelephone 10 in which the present invention may be incorporated is illustrated with a "bottom-hinged" flip cover 22. The illustrated radiotelephone 10 includes a top handset housing 12 and a bottom handset housing 14 connected thereto to form a cavity therein. Top and bottom handset housings 12 and 14 house a keypad 16 including a plurality of keys 18, a display 20, and electronic components (not shown) that enable the radiotelephone 10 to transmit and receive telecommunications signals. A flip cover 22 is hinged to the bottom end 13 of the top housing 12, as illustrated.

In operation, the flip cover 22 may be pivoted by a user about an axis A between an open position and a closed position. When in a closed position, the flip cover 22 may provide protection to the keypad 16 mounted within the top handset housing 12 from unintentional activation or exposure to the elements. When in an open position, the flip cover 22 may provide a convenient extension to the radiotelephone 10 and, when fitted with a microphone, may be favorably positioned to receive audio input from a user.

Referring now to FIG. 1B, a radiotelephone 30 in which the present invention may be incorporated is illustrated with a "top-hinged" flip cover 32. The illustrated radiotelephone 30 includes a top handset housing 12 and a bottom handset housing 14 connected thereto to form a cavity therein. Top and bottom handset housings 12 and 14 house a keypad 16 including a plurality of keys 18, a display 20, and electronic components (not shown) that enable the radiotelephone 30 to transmit and receive telecommunications signals. A flip cover 32 is hinged to the top end 15 of the top housing 12, and is configured to house a speaker 46 therewithin, as illustrated.

In operation, the flip cover 32 may be pivoted by a user about an axis A between an open position and a closed position. When in a closed position, the flip cover 32 may provide protection to the keypad 16 mounted within the top handset housing 12 from unintentional activation or exposure to the elements. When in an open position, the speaker 46 within the flip cover 32 may be favorably positioned to provide audio output to a user.

A conventional arrangement of electronic components that enable a radiotelephone to transmit and receive telecommunications signals is shown schematically in FIG. 2, and is understood by those skilled in the art of radiotelephone communications. An antenna 43 for receiving and transmitting telecommunication signals is electrically connected to a radio-frequency transceiver 44 that is further electrically connected to a controller 45, such as a microprocessor. The controller 45 is electrically connected to a speaker 46 that transmits a remote signal from the controller 45 to a user of a radiotelephone. The controller 45 is also electrically connected to a microphone 47 that receives a voice signal from a user and transmits the voice signal through the controller 45 and transceiver 44 to a remote device. The controller 45 is electrically connected to a keypad 16 and display 20 that facilitate radiotelephone operation.

Referring now to FIGS. 3A–3B, a radiotelephone 50 incorporating the present invention is illustrated. The illustrated radiotelephone 50 includes a housing 52 that is configured to enclose electronic components (not shown) that transmit and receive radiotelephone communications signals, and a "top-hinged" flip cover 54 secured to the housing 52 via a hinge assembly 55, as illustrated. The flip cover 54 is pivotable, relative to the housing 52, between a closed position and an open position. In the closed position (FIG. 3A), the flip cover 54 is in overlying, adjacent relationship with the housing 52, as illustrated. In the open position (FIG. 3B), the flip cover 54 is disposed at an angle, relative to the housing 52, as illustrated. A spring member 56 is incorporated with the hinge assembly 55 and is configured to exert a biasing force on the flip cover 54 to urge the flip cover 54 to the open position. Hinge assemblies for electronic devices, such as radiotelephones, that incorporate springs for exerting a biasing force on a flip cover or other appendage are known to those skilled in this art, and need not be described further herein.

Still referring to FIGS. 3A–3B, a first magnet 60*a* is disposed within the housing 52, and a second magnet 60*b* is disposed within the flip cover 54 so as to be magnetically attracted to the first magnet 60*a* when the flip cover 54 is in the closed position (FIG. 3A). The first and second magnets 60*a*, 60*b* are configured such that a magnetic attraction force therebetween is greater than the biasing force of the spring member 56. Accordingly, the magnetic force between first and second magnets 60*a*, 60*b* is sufficient to maintain the flip cover 54 in the closed position against the biasing force of the spring member 56.

Preferably, the first and second magnets 60*a*, 60*b* are dipole, ferro-electric magnets; however, various types and configurations of magnets may be utilized. Alternatively, in lieu of two magnets, a single magnet in combination with a magnetic object, such as an iron object, can be used. For example, magnet 60*a* could be replaced with a magnetic object.

To allow the flip cover 54 to move to an open position, another magnetic field is generated in the vicinity of the magnetic force between the first and second magnets 60*a*, 60*b*. The generated magnetic field serves as means for reducing the magnetic force between the first and second magnets 60*a*, 60*b*, relative to the biasing force of the spring member 56, such that the flip cover 54 is urged to the open position by the spring member 56. Preferably, a magnetic field is generated by a magnetic field generator disposed adjacent to one or both of the first and second magnets 60*a*, 60*b*.

A preferred magnetic field generator is a conductive coil 62 having electric current flowing therethrough to produce a magnetic field. However, other types of magnetic field generators may be utilized in accordance with the present invention, without limitation. A conductive coil 62 preferably encircles the first magnet 60*a*, as illustrated in FIGS. 3A–3B and in the enlarged, fragmented view of FIG. 4.

Figure 5:
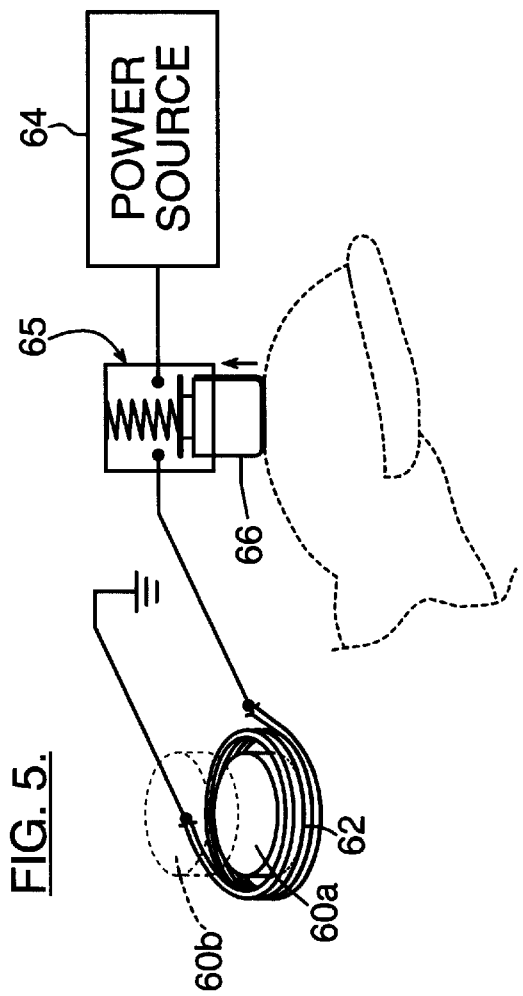
FIG. 5 illustrates an electrical circuit for inducing electrical current flow through a conductive coil, according to the present invention.

Referring now to FIG. 5, an electrical circuit 61, is schematically illustrated. The electrical circuit 61 is disposed within the radiotelephone housing 52 of FIGS. 3A–3B and is configured to connect the conductive coil 62 with an electrical power source 64. The illustrated electrical circuit 61 includes a switching element 65 for interrupting flow of electrical current between the electrical power source 64 and the conductive coil 62. Preferably, the power source is a direct current (D.C.) power source, such as a battery or a capacitor charged by a battery.

The switching element 65 is controlled by a control device 66 accessible to a user. Preferably, the switching element control device 66 extends through a portion of the housing 52 in a location conveniently located for a user. Even more preferably, the switching element control device 66 is in a location that facilitates operation of the switching element control device 66 with the same hand that is holding the radiotelephone 50. The electrical circuit 61 serves as means for inducing electrical current flow through the conductive coil.

When a user activates the illustrated switching element control device 66 so as to close the switching element 65, the circuit between the power source 64 and the conductive coil 62 is completed and electrical current can flow through the conductive coil to generate a magnetic field. The coil 62 is preferably configured such that the generated magnetic field is of sufficient strength to at least partially overcome the mutual attraction of the first and second magnets 60*a*, 60*b*.

Figure 6A:
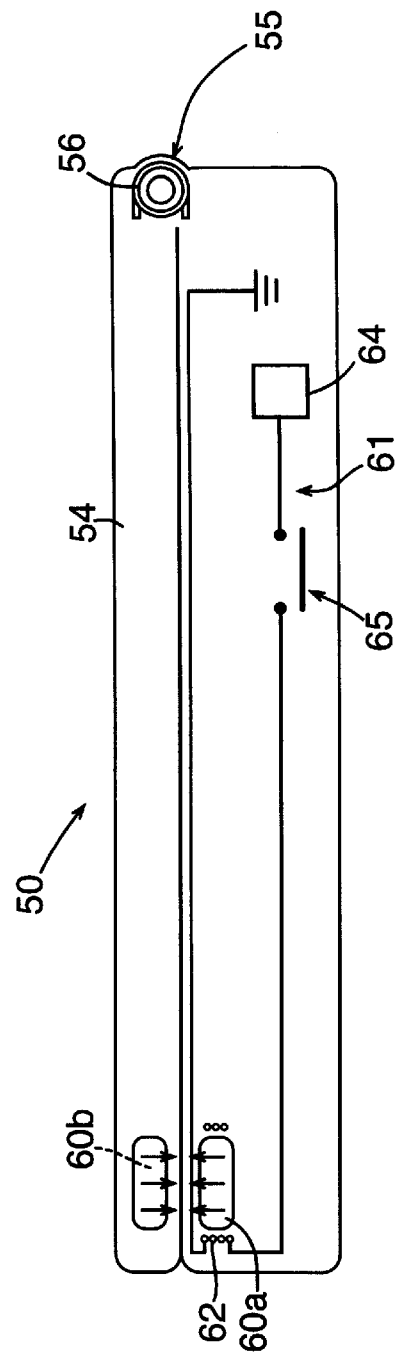
FIG. 6A illustrates the radiotelephone of FIGS. 3A–3B with the flip cover secured in the closed position via a pair of magnetic objects, according to the present invention.

Referring to FIGS. 6A–6C, operations for opening the flip cover 54 of a radiotelephone 50 incorporating the present invention, is illustrated. In FIG. 6A, the flip cover 54 is in the closed position. Because the magnetic force between the first and second magnets 60*a*, 60*b* is greater than the biasing force of the spring member 56, the flip cover 54 is maintained in the closed position. The switching element 65 within the electrical circuit 61 is schematically illustrated in the open position. Accordingly, electrical current is prevented from flowing through the conductive coil 62 via the electrical power source 64.

In FIG. 6B, a user has activated the switching element 65, thereby closing the electrical circuit 61 and allowing electrical current to flow from the electrical power source 64 into the conductive coil 62. The magnetic field generated by the conductive coil 62 reduces the magnetic force between the first and second magnets 60*a*, 60*b* such that the biasing force of the spring member 56 urges the flip cover 54 towards the open position.

In FIG. 6C, the flip cover 54 is in a fully opened position. The switching element 65 returns to a position such that the electrical circuit between the electrical power source 64 and the conductive coil 62 is open. Accordingly, upon pivoting the flip cover to the closed position, the first and second magnets 60*a*, 60*b* generate an attractive magnetic force therebetween that maintains the flip cover 54 in the closed position.

According to another embodiment of the present invention, the second magnet 60*b* may be a magnet associated with the speaker 46 disposed within the flip cover 54. Alternatively, if the speaker is disposed within the housing 52 of the radiotelephone 50, the first magnet 60*a* may be a magnet associated with the speaker 46 disposed within the housing 52.

The present invention is not limited to the illustrated embodiment. Various electrical circuits may serve as means for inducing electrical current flow through a conductive coil. Furthermore, the first and second magnets 60*a*, 60*b* may be disposed within the radiotelephone housing 52 and flip cover 54, respectively, in various configurations and positions. The present invention may be utilized with top-hinged and bottom-hinged flip covers. Furthermore, the present invention may be utilized with various electronic devices having an appendage that pivots relative to the housing of the electronic device.

According to another embodiment of the present invention, one or more pairs of magnets may be utilized to maintain housing portions of an electronic device in an assembled configuration without the need for mechanical fasteners. Referring to FIG. 7, a radiotelephone 70 includes a housing 72 having top and bottom housing portions 74, 75. The top and bottom housing portions 74, 75 are configured to be joined together to enclose electronic components for sending and receiving radiotelephone communications. At a first end 70a of the radiotelephone 70, first magnets 76a, 76a' are disposed within the bottom housing portion 75 and second magnets 76b, 76b' are disposed within the top housing portion 74, as illustrated. Similarly, at an opposite second end 70b of the radiotelephone 70, first magnets 77a, 77a' are disposed within the bottom housing portion 75 and second magnets 77b, 77b' are disposed within the top housing portion 74, as illustrated.

The respective pairs 76 and 77 of first and second magnets 76a–76b and 77a–77b are positioned along one side 70c of the illustrated radiotelephone 70. Similarly, the respective pairs 76' and 77' of first and second magnets 76a', 76b' and 77a', 77b' are positioned along an opposite side 70d of the illustrated radiotelephone 70. However, it is to be understood that the present invention is not limited to the illustrated arrangement of magnets in FIG. 7. Various numbers and configurations of magnets may be utilized according to the present invention. For example, a single pair of first and second magnets could be utilized to secure the top and bottom housing portions 74, 75 together. Alternatively, a magnet associated with the speaker 46 could be utilized as one of the magnets in a respective pair. In addition, in lieu of two magnets in each of the illustrated pairs of magnets, a single magnet in combination with magnetic material, such as iron, could be used.

The respective illustrated pairs 76, 76', 77, and 77' of magnets are positioned within the top and bottom housing portions 74, 75 so as to be magnetically attracted to each other when the first and second housing portions 74, 75 are joined together. The respective pairs 76, 76', 77, and 77' of magnets are configured such that the magnetic attraction force therebetween strongly resists forces exerted by a user trying to pull the housing portions apart.

To separate the top and bottom housing portions 74, 75 from each other, the magnetic attraction force between each pair 76, 76', 77, and 77' of magnets can be reduced by a magnetic field generator, such as a conductive coil, disposed adjacent to at least one of the magnets in each pair. In the illustrated embodiment, conductive coils 78 and 78' encircle respective first magnets 76a and 76a'. Similarly, conductive coils 80 and 80' encircle respective first magnets 77a and 77a'.

Referring now to FIG. 8, an electrical circuit 61', disposed within the radiotelephone housing 72, for connecting the respective conductive coils 78, 80 with an electrical power source 64, is schematically illustrated. The electrical circuit 61' includes a switching element 65 for interrupting flow of electrical current between the electrical power source 64 and the conductive coils 78, 80. Preferably, the power source is a direct current (D.C.) power source.

It is to be understood that the illustrated electrical circuit 61' could also be used to connect respective conductive coils 78', 80' with an electrical power source 64.

The switching element 65 is controlled by a control device 66 accessible to a user. Preferably, the switching element control device 66 is recessed within a port 82 in the housing 72 so as to reduce the likelihood of inadvertent activation. The electrical circuit 61' serves as means for inducing electrical current flow through the conductive coils 78, 80.

When a user activates the illustrated switching element control device 66 so as to close the switching element 65, the circuit between the power source 64 and the conductive coils 78, 80 is completed and electrical current can flow through the conductive coils 78, 80 to generate a magnetic field. Each of the coils 78, 80 is preferably configured such that the generated magnetic field is of sufficient strength to at least partially overcome the mutual attraction of each the respective magnet pairs 76, 77. Accordingly, a user can then physically separate the top and bottom housing portions 74, 75.

Figure 9:
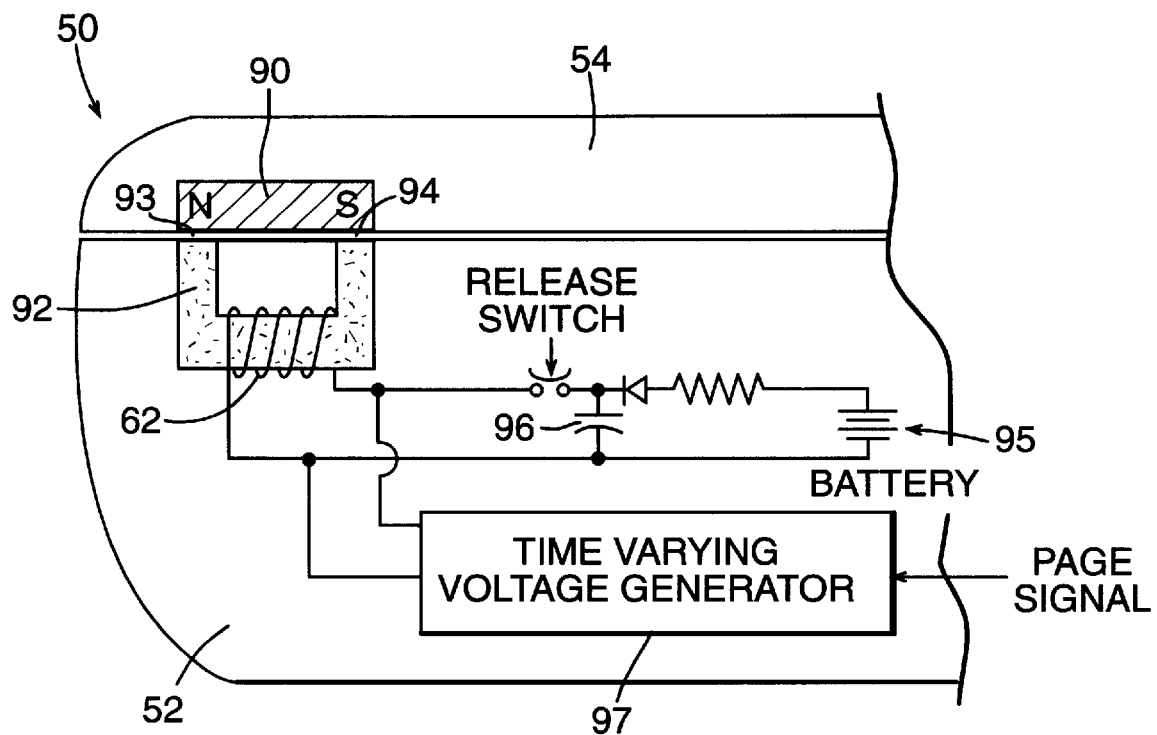
FIG. 9 illustrates another embodiment of the present invention wherein a magnetic latch device serves as a vibrator upon receipt of a paging signal.

Referring now to FIG. 9, a radiotelephone 50 incorporating another embodiment of the present invention is illustrated. The illustrated radiotelephone 50 includes a housing 52 that is configured to enclose electronic components (not shown) that transmit and receive radiotelephone communications signals, and a "top-hinged", spring-activated flip cover 54 secured to the housing 52 via a hinge assembly (not shown). The flip cover 54 is pivotable, relative to the housing 52, between a closed position and an open position. In the closed position, the flip cover 54 is in overlying, adjacent relationship with the housing 52, as illustrated.

A magnet 90 is disposed within the flip cover 54, and a magnetic object 92 is disposed within the housing 52 so as to be magnetically attracted to the magnet 90 when the flip cover 54 is in the closed position. The magnet 90 and magnetic object 92 are configured such that a magnetic attraction force therebetween is greater than the biasing force of a spring member for urging the flip cover 54 to an open position. Accordingly, the magnetic force between the magnet 90 and magnetic object 92 is sufficient to maintain the flip cover 54 in the closed position against the biasing force of a spring member. Preferably, the magnetic object 92 is formed from iron or other materials containing iron.

In the illustrated embodiment, air gaps 93 and 94 between the magnet 90 and the magnetic object 92 when the flip cover 54 is in the closed position are preferably very small. By maintaining small air gaps 93, 94, the flux density can be maximized which maximizes the magnetic attraction between the magnet 90 and magnetic object 92. Furthermore, flux leakage into other areas within the radiotelephone can be reduced or prevented altogether. Even more preferably, no air gaps exist.

The magnetic object 92 has a "U-shaped" configuration, as illustrated. A conductive coil 62 encircles the magnetic object 92 and is configured to produce a magnetic field when a pulse of electric current flows therethrough. The generated magnetic field serves as means for reducing the magnetic force between the magnet 90 and magnetic object 92 relative to the biasing force of the spring member, such that the flip cover 54 is urged to the open position by the spring member.

The direction of the electric current and the direction of the winding of the coil 62 are such that the magnetic flux generated opposes the magnetic flux of the magnet 90. If the opposing magnetic flux is equal to the magnetic flux of the magnet 90, the flip cover 54 will release and move to the open position. If the opposing magnetic flux exceeds the magnetic flux of the magnet 90, the flip cover 54 will be accelerated to the open position. Electric current may be provided to the coil 62 via a D.C. power source, such as a battery 95. In the illustrated embodiment, the battery 95 charges a capacitor 96. Electric current is taken from the capacitor 96 to relieve the battery 95 of a heavy electric current pulse.

According to another aspect of the present invention, magnet 90 and magnetic object 92 may also serve as a vibrator as an indicator of an incoming call. A time-varying voltage may be supplied from a time-varying voltage generator 97 to the coil 62 when a page signal is received. Time-varying voltage generators are understood by those skilled in this art and need not be described further herein. The supplied voltage causes the flip cover 54 to vibrate as the magnetic force between the magnet 90 and magnetic object 92 varies with the time-varying voltage. The time-varying voltage may be pulsed in resonance with a resonant frequency (also referred to as a natural frequency) of the radiotelephone/flip cover system, generating much larger flip cover displacements than if some other "off resonance" frequency were used.

According to another aspect of the present invention, the magnet 90 may be disposed within the flip cover 54 so as to have some freedom of movement. Accordingly, the magnet 90 could vibrate upon receipt of a paging signal.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An electronic device comprising:

a housing;

an appendage hinged to the housing and pivotable, relative to the housing, between a closed position and an open position, wherein the appendage is in overlying, adjacent relationship with at least a portion of the housing when in the closed position, and wherein the appendage is disposed at an angle, relative to the housing, when in the open position;

a spring member that exerts a biasing force on the appendage to urge the appendage to the open position;

a first magnetic object disposed within the housing;

a second magnetic object disposed within the appendage so as to be magnetically attracted to the first magnetic object when the appendage is in the closed position;

wherein the first and second magnetic objects are configured such that a magnetic attraction force therebetween is greater than the biasing force of the spring member such that the appendage is maintained in the closed position; and a magnetic field generator disposed adjacent to at least one of the first and second magnetic objects, wherein the magnetic field generator is configured to reduce the magnetic attraction force between the first and second magnetic objects relative to the biasing force of the spring member such that the appendage is urged to the open position by the spring member.

2. An electronic device according to claim 1 wherein the magnetic field generator comprises a conductive coil disposed adjacent to at least one of the first and second magnetic objects, wherein the conductive coil is configured to generate a magnetic field when electrical current flow is induced therein.

3. An electronic device according to claim 2 wherein the conductive coil encircles at least one of the first and second magnetic objects.

4. An electronic device according to claim 2 further comprising means for inducing electrical current flow through the conductive coil.

5. An electronic device according to claim 4 wherein the means for inducing electrical current flow through the conductive coil comprises:

an electrical power source disposed within the housing; and means for connecting the electrical power source to the conductive coil in response to user activation of an activating device extending through a portion of the housing.

6. An electronic device according to claim 1 wherein the first magnetic object is a magnet and the second magnetic object is an iron object.

7. An electronic device according to claim 1 wherein the second magnetic object is a magnet and the first magnetic object is an iron object.

8. An electronic device according to claim 1 wherein the first and second magnetic objects are magnets.

9. A radiotelephone comprising:

a housing configured to enclose electronic components that transmit and receive radiotelephone communications signals;

a flip cover hinged to the housing and pivotable, relative to the housing, between a closed position and an open position, wherein the flip cover is in overlying, adjacent relationship with at least a portion of the housing when in the closed position, and wherein the flip cover is disposed at an angle, relative to the housing, when in the open position;

a spring member that exerts a biasing force on the flip cover to urge the flip cover to the open position;

a first magnetic object disposed within the housing;

a second magnetic object disposed within the flip cover so as to be magnetically attracted to the first magnetic object when the flip cover is in the closed position;

wherein the first and second magnetic objects are configured such that a magnetic attraction force therebetween is greater than the biasing force of the spring member such that the flip cover is maintained in the closed position; and a magnetic field generator disposed adjacent to at least one of the first and second magnetic objects, wherein the magnetic field generator is configured to reduce the magnetic attraction force between the first and second magnetic objects relative to the biasing force of the spring member such that the flip cover is urged to the open position by the spring member.

10. A radiotelephone according to claim 9 wherein the magnetic field generator comprises a conductive coil disposed adjacent to at least one of the first and second magnetic objects, wherein the conductive coil is configured to generate a magnetic field when electrical current flow is induced therein.

11. A radiotelephone according to claim 10 wherein the conductive coil encircles at least one of the first and second magnetic objects.

12. A radiotelephone according to claim 10 further comprising means for inducing electrical current flow through the conductive coil.

13. A radiotelephone according to claim 12 wherein the means for inducing electrical current flow through the conductive coil comprises:

an electrical power source disposed within the housing; and means for connecting the electrical power source to the conductive coil in response to user activation of an activating device extending through a portion of the housing.

14. A radiotelephone according to claim 9 wherein a speaker is disposed within the flip cover and wherein the second magnetic object is a magnet associated with the speaker.

15. A radiotelephone according to claim 9 wherein a speaker is disposed within the housing and wherein the first magnetic object is a magnet associated with the speaker.

16. An electronic device according to claim 9 wherein the first magnetic object is a magnet and the second magnetic object is an iron object.

17. An electronic device according to claim 9 wherein the second magnetic object is a magnet and the first magnetic object is an iron object.

18. An electronic device according to claim 9 wherein the first and second magnetic objects are magnets.

19. A radiotelephone comprising:

a housing configured to enclose electronic components that transmit and receive radiotelephone communications signals;

a flip cover hinged to the housing and pivotable, relative to the housing, between a closed position and an open position, wherein the flip cover is in overlying, adjacent relationship with at least a portion of the housing when in the closed position, and wherein the flip cover is disposed at an angle, relative to the housing, when in the open position;

a spring member that exerts a biasing force on the flip cover to urge the flip cover to the open position;

a first magnetic object disposed within the housing;

a second magnetic object disposed within the flip cover so as to be magnetically attracted to the first magnetic object when the flip cover is in the closed position;

wherein the first and second magnetic objects are configured such that a magnetic attraction force therebetween is greater than the biasing force of the spring member such that the flip cover is maintained in the closed position;

a conductive coil that encircles one of the first and second magnetic objects; and means for inducing electrical current flow through the conductive coil to reduce the magnetic attraction force between the first and second magnetic objects relative to the biasing force of the spring member such that the flip cover is urged to the open position by the spring member.

20. A radiotelephone according to claim 19 wherein the means for inducing electrical current flow through the conductive coil comprises:

an electrical power source disposed within the housing; and means for connecting the electrical power source to the conductive coil in response to user activation of an activating device extending through a portion of the housing.

21. A radiotelephone according to claim 19 wherein a speaker is disposed within the flip cover and wherein the second magnetic object is a magnet associated with the speaker.

22. A radiotelephone according to claim 19 wherein a speaker is disposed within the housing and wherein the first magnetic object is a magnet associated with the speaker.

23. An electronic device comprising:

a housing, including a first portion and a second portion, wherein the first and second housing portions are configured to be joined together to enclose electronic components;

a first magnetic object disposed within the first housing portion;

a second magnetic object disposed within the second housing portion so as to be magnetically attracted to the first magnetic object when the first and second housing portions are joined together, and wherein the first and second magnetic objects are configured such that a magnetic attraction force therebetween maintains the first and second housing portions joined together; and a magnetic field generator disposed adjacent to at least one of the first and second magnetic objects, wherein the magnetic field generator is configured to reduce the magnetic attraction force between the first and second magnetic objects such that the first and second housing portions can be separated.

24. An electronic device according to claim 23 wherein the magnetic field generator comprises a conductive coil disposed adjacent to at least one of the first and second magnetic objects, wherein the conductive coil is configured to generate a magnetic field when electrical current flow is induced therein.

25. An electronic device according to claim 24 wherein the conductive coil encircles at least one of the first and second magnetic objects.

26. An electronic device according to claim 24 further comprising means for inducing electrical current flow through the conductive coil.

27. An electronic device according to claim 26 wherein the means for inducing electrical current flow through the conductive coil comprises:

an electrical power source disposed within the housing; and means for connecting the electrical power source to the conductive coil in response to user activation of an activating device extending through a portion of the housing.

28. An electronic device according to claim 23 wherein the electronic device is a radiotelephone.

29. An electronic device according to claim 23 wherein the first magnetic object is a magnet and the second magnetic object is an iron object.

30. An electronic device according to claim 23 wherein the second magnetic object is a magnet and the first magnetic object is an iron object.

31. An electronic device according to claim 23 wherein the first and second magnetic objects are magnets.

32. An electronic device comprising:

a housing;

an appendage hinged to the housing and pivotable, relative to the housing, between a closed position and an open position, wherein the appendage is in overlying, adjacent relationship with at least a portion of the housing when in the closed position, and wherein the appendage is disposed at an angle, relative to the housing, when in the open position;

a first magnetic object disposed within the housing;

a second magnetic object disposed within the appendage so as to be magnetically attracted to the first magnetic object when the appendage is in the closed position;

means for reducing the magnetic attraction force between the first and second magnetic objects such that the appendage can be urged to the open position; and means for supplying a time-varying voltage to the magnetic attraction force reduction means when a page signal is received by the electronic device to cause at least one of the first and second magnetic objects to vibrate.

33. An electronic device according to claim 32 wherein the first magnetic object is disposed within the housing with freedom of movement in at least one direction.

34. An electronic device according to claim 32 wherein the second magnetic object is disposed within the appendage with freedom of movement in at least one direction.

35. An electronic device according to claim 32 wherein the means for reducing the magnetic attraction force between the first and second magnetic objects comprises a magnetic field generator disposed adjacent to at least one of the first and second magnetic objects.

36. An electronic device according to claim 32 wherein the means for reducing the magnetic attraction force between the first and second magnetic objects comprises a conductive coil disposed adjacent to at least one of the first and second magnetic objects, wherein the conductive coil is configured to generate a magnetic field when electrical current flow is induced therein.

37. An electronic device according to claim 36 wherein the conductive coil encircles at least one of the first and second magnetic objects.

38. An electronic device according to claim 36 further comprising means for inducing electrical current flow through the conductive coil.

39. An electronic device according to claim 38 wherein the means for inducing electrical current flow through the conductive coil comprises:

an electrical power source disposed within the housing; and means for connecting the electrical power source to the conductive coil in response to user activation of an activating device extending through a portion of the housing.

40. An electronic device according to claim 32 wherein the first magnetic object is a magnet and the second magnetic object is an iron object.

41. An electronic device according to claim 32 wherein the second magnetic object is a magnet and the first magnetic object is an iron object.

42. An electronic device according to claim 32 wherein the first and second magnetic objects are magnets.

43. An electronic device according to claim 32 wherein the electronic device is a radiotelephone.

44. An electronic device according to claim 38 wherein the means f or supplying a time-varying voltage to the magnetic attraction force reduction means when a page signal is received by the electronic device comprises a time-varying voltage generator connected to the conductive coil.

45. An electronic device according to claim 32 wherein at least one of the first and second magnets vibrates at a resonant frequency of the electronic device when the time-varying voltage is supplied to the magnetic attraction force reduction means.

* * * * *

UNITED STATES PATENT AND TRADEMARK OFFICE
CERTIFICATE OF CORRECTION

PATENT NO. : 6,151,486  
DATED : November 21, 2000  
INVENTOR(S) : Holshouser et al.

Page 1 of 1

It is certified that error appears in the above-identified patent and that said Letters Patent is hereby corrected as shown below:

Column 14,  
Line 25, please change "f or" to -- for --.

Signed and Sealed this

Twenty-third Day of October, 2001

Attest:

Attesting Officer

NICHOLAS P. GODICI  
Acting Director of the United States Patent and Trademark Office